United States Patent [19]

Hayhurst

[11] 3,757,377
[45] Sept. 11, 1973

[54] WINDSHIELD WIPER CLIP ASSEMBLIES
[75] Inventor: George Hayhurst, Oakville, Ontario, Canada
[73] Assignee: Tridon Limited, Burlington, Ontario, Canada
[22] Filed: Oct. 26, 1971
[21] Appl. No.: 192,426

[52] U.S. Cl. ............................................ 15/250.32
[51] Int. Cl. ............................................... B60s 1/40
[58] Field of Search .................... 15/250.31, 250.32, 15/250.34, 250.42

[56] References Cited
UNITED STATES PATENTS

| | | | |
|---|---|---|---|
| 2,170,939 | 8/1939 | Christen | 15/250.32 |
| 2,172,791 | 9/1939 | Foster | 15/250.32 |
| 2,432,692 | 12/1947 | Smulski | 15/250.32 |
| 2,694,827 | 11/1954 | Bacher | 15/250.32 |
| 3,085,277 | 4/1963 | Bock et al. | 15/250.32 |

FOREIGN PATENTS OR APPLICATIONS

| | | | |
|---|---|---|---|
| 721,443 | 11/1965 | Canada | 15/250.32 |
| 1,100,069 | 1/1968 | Great Britain | 15/250.32 |

*Primary Examiner*—Peter Feldman
*Attorney*—Stanley J. Rogers

[57] ABSTRACT

A windshield wiper clip assembly for mounting a windshield wiper on to a wiper arm of shepherds crook configuration comprises a body of U-shape side cross-section which is closely embraced by the crook-shaped end, with outwardly-extending side walls forming a groove in which the arm lies. The side walls have facing projections which are spread apart when the arm is pressed into the groove and spring back behind it to retain it on the body, the projections having cam-faces inclined to facilitate this spreading apart. The assembly may be mounted on the wiper backing member by a saddle-shaped portion having bores which engage cooperating pivot pins on the backing member.

3 Claims, 5 Drawing Figures

PATENTED SEP 11 1973

3,757,377

INVENTOR
GEORGE HAYHURST

BY Stanley J. Rogers

PATENT AGENT

WINDSHIELD WIPER CLIP ASSEMBLIES

FIELD OF THE INVENTION

This invention relates to improvements in windshield wiper clip assemblies employed for connecting a windshield wiper to a motor-operated arm by which the wiper is moved across a windshield.

SUMMARY OF THE INVENTION

The principal object of the invention is to provide a new clip assembly of simple and inexpensive form, especially suited for use with a wiper arm having a wiper engaging end of the so-called "shepherd's crook" configuration.

It is another object to provide such an assembly especially adapted for manufacture as a plastic moulding.

It is a further object of the invention to provide such a windshield wiper clip assembly especially adapted for use in conjunction with a windshield wiper produced by moulding from plastic material.

In accordance with the present invention there is provided a windshield wiper clip assembly for the detachable attachment of a wiper to a wiper arm, wherein the arm has a wiper-engaging end of U-shaped shepherds crook configuration having the tip thereof turned back upon itself to extend parallel to the major part of the arm with an intervening rounded portion, the clip assembly comprising a body adapted for retaining engagement with a wiper superstructure backing member embraced by the said wiper-engaging arm end, the body being of U-shaped cross-section at the part thereof embraced by the arm to fit within the U-shaped arm end and having parallel side walls on either side of the U-shaped cross-section body part, the side walls forming between themselves a groove in which the arm end is engaged and held against transverse movement, and resilient arm-retaining means on the body comprising a pair of projections extending toward one another from the said side walls adjacent the base of the U-shaped portion of the body part embraced by the arm end, the projections being movable apart away from each other against the resilience of the material of the body upon insertion of the arm end between the projections, the projections being spaced from the said base of the U-shaped portion to engage behind the U-shaped arm end when the latter is embracing the said body part to retain the arm thereon.

DESCRIPTION OF THE DRAWINGS

A particular preferred embodiment of the invention will now be described, by way of example, with reference to the accompanying drawing, wherein.

DESCRIPTION OF THE PREFERRED EMBODIMENTS

Figure 1:
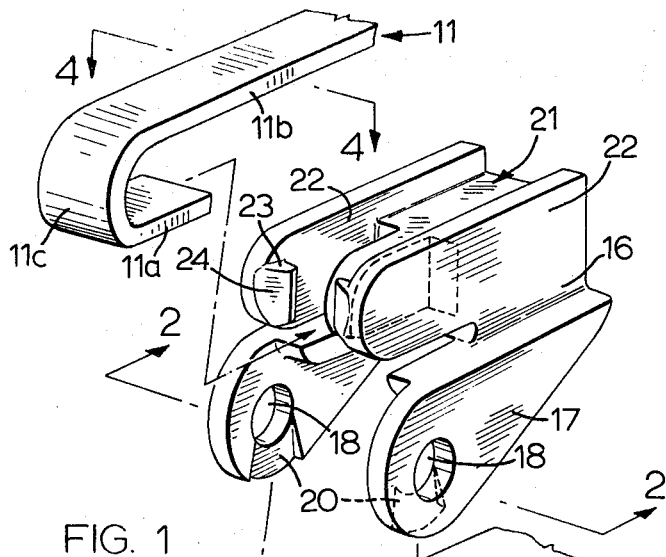
FIG. 1 is an exploded perspective view showing the combination of a portion of a windshield wiper, the end of a wiper arm and a clip assembly of the invention.

In the combination illustrated herein a windshield wiper 10 is mounted on an arm 11 of "shepherd's crook" type, wherein the free end 11a of the arm is turned back upon itself to extend parallel to the major part 11b of the arm, and also to form a rounded base portion 11c connecting the two arm parts. The wiper comprises a superstructure including an elongated backing member having its ends connected by respective junctions to subsidiary yoke arms, each yoke arm being provided at its ends with respective pairs of claws, these claws enabling a squeeqee assembly to be mounted in the superstructure. The entire superstructure is formed by means of a single moulding operation, and for further details of its design and construction reference may be made to our U.S. Pat. Nos. 3,176,337 and 3,408,680.

Figure 2:
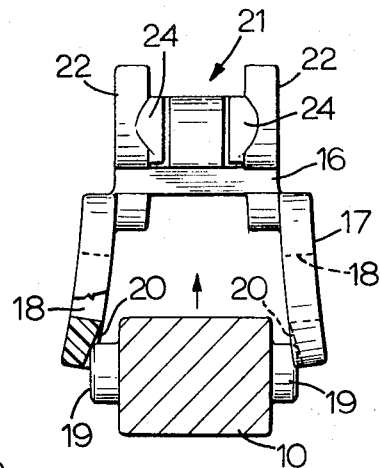
FIG. 2 is a section taken on the line 2—2 of FIG. 1 and illustrating the mounting of the assembly on the wiper portion.
Figure 3:
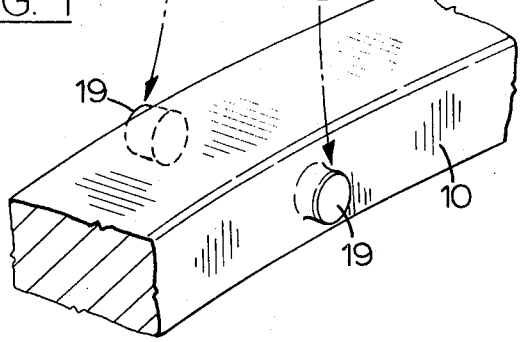
FIG. 3 is a section similar to FIG. 2 showing the wiper arm mounted on the assembly.
Figure 3:
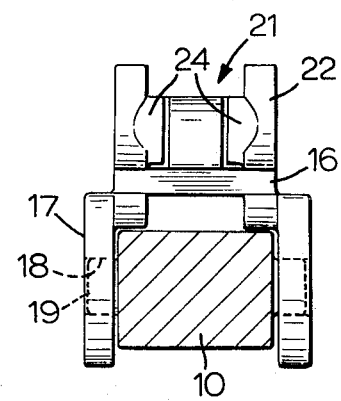

The clip assembly in accordance with this invention connects the arm 11 and the superstructure and comprises a body 16 moulded as an integral unit of plastic material and including a saddle-shaped portion constituted by a pair of downwardly-extending legs 17 which closely straddle the central portion of the superstructure 10. The legs are provided with coaxial bores 18, each of which is engageable over a respective pin 19 of the superstructure, by which the clip member pivots relative to the superstructure about a corresponding transverse axis. Each bore is provided with a cam face 20 permitting the clip member to be mounted on the superstructure simply by pushing it firmly towards the superstructure, as indicated by the arrow in FIG. 2, with the pins 19 engaged by the respective cam faces, when the resilience of the material will permit the arms 17 to open and then snap back on to the pins, as illustrated by FIG. 3.

Figure 5:
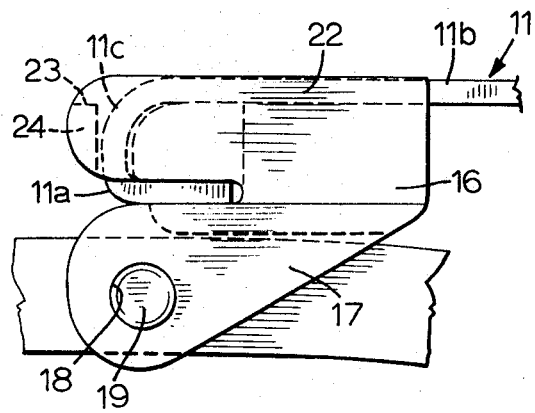
FIG. 5 is a side view showing the assembled combination of FIG. 1.
Figure 4:
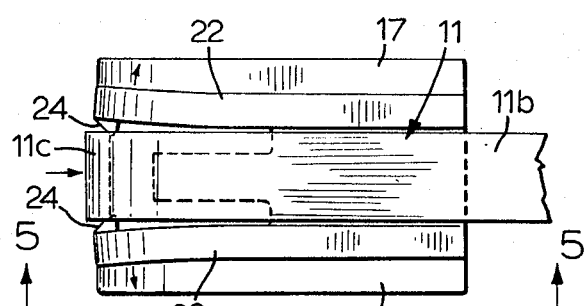
FIG. 4 is a view on the line 4—4 of FIG. 1 illustrating the mounting of the wiper arm on the clip assembly.

An arm-receiving portion of the body 16 integral therewith is of U-shaped side cross-section, so that it is shaped to receive the shepherd's crook end of the wiper arm and be closely embraced thereby, with the shorter arm portion 11a engaged in a recess between the saddle and arm-receiving portions and with the longer arm portion 11b resting in a groove 21 between two outwardly-extending side walls 22, the walls retaining the arm against transverse movement. As the arm is mounted the arm-receiving portion the rounded base 11c of the crook is pushed against two inwardly-extending retaining ridges 23 (see arrow in FIG. 2) which protrude into the groove 21. The front faces 24 of these ridges are inclined to provide corresponding cam faces, so that as an operator presses the arm crook on to the assembly the ridges are spread apart by the cam action until the crook has passed beyond them to the position shown in FIG. 5. Thereafter they spring together under the resilience of the material and engage behind the arm portion 11c to retain it firmly on the clip assembly.

It will be seen therefore that the present invention provides an extremely simple and effective wiper clip assembly which, despite its relative complexity of function and operation, can readily be moulded from plastic material. When once in place the wiper arm is held securely, and can be easily released whenever required for replacement of the windshield wiper.

I claim:

1. A windshield wiper clip assembly for the detachable attachment of a wiper to a wiper arm, wherein the arm has a wiper-engaging end of U-shaped shepherds crook configuration having the tip thereof turned back upon itself to extend parallel to the major part of the arm with an intervening rounded portion, the clip assembly comprising a body adapted for retaining engagement with a wiper superstructure backing member embraced by the said wiper-engaging arm end, the body being of U-shaped cross-section at the part thereof embraced by the arm to fit within the U-shaped arm end and having parallel side walls on either side of the U-shaped cross-section body part, the side walls forming between themselves a groove in which the arm end is engaged and held against transverse movement, and resilient arm-retaining means on the body comprising a pair of projections extending toward one another from the said side walls adjacent the base of the U-shaped portion of the body part embraced by the arm end, the projections being movable apart away from each other against the resilience of the material of the body upon insertion of the arm end between the projections, the projections being spaced from the said base of the U-shaped portion to engage behind the U-shaped arm end when the latter is embracing the said body part to retain the arm thereon.

2. The invention as claimed in claim 1, wherein each of the said pair of projections is provided with a respective cam face inclined in the direction of movement of the arm end when mounting the arm end on the assembly body part so as to facilitate the moving apart of the projections.

3. The invention as claimed in claim 1, wherein means adapting the body for retaining engagement on the windshield wiper backing member comprises an integral saddle-shaped portion thereof having parallel arms spaced to closely embrace the backing member, the arm having registering bores engageable on corresponding transversely projecting pins of the backing member to form a pivoted connection of the assembly to the backing member.

* * * * *